US008485140B2

(12) United States Patent
Field

(10) Patent No.: US 8,485,140 B2
(45) Date of Patent: Jul. 16, 2013

(54) FUEL COMBUSTION METHOD AND SYSTEM

(75) Inventor: Bruce F. Field, Golden Valley, MN (US)

(73) Assignee: Global Patent Investment Group, LLC, Rogers, MN (US)

( * ) Notice: Subject to any disclaimer, the term of this patent is extended or adjusted under 35 U.S.C. 154(b) by 863 days.

(21) Appl. No.: 12/479,006

(22) Filed: Jun. 5, 2009

(65) Prior Publication Data

US 2009/0301445 A1 Dec. 10, 2009

Related U.S. Application Data

(60) Provisional application No. 61/059,175, filed on Jun. 5, 2008.

(51) Int. Cl.

| | |
|---|---|
| ***F02B 43/08*** | (2006.01) |
| ***F02B 51/00*** | (2006.01) |
| ***C25B 1/02*** | (2006.01) |
| ***B01D 17/06*** | (2006.01) |
| ***F02M 27/00*** | (2006.01) |

(52) U.S. Cl.
USPC ............... 123/3; 123/536; 123/537; 123/538; 205/638; 205/687

(58) Field of Classification Search
USPC ....................... 123/3, 536–538; 205/687, 638
See application file for complete search history.

(56) References Cited

U.S. PATENT DOCUMENTS

| | | | | |
|---|---|---|---|---|
| 3,311,097 | A * | 3/1967 | Mittelstaedt | 123/537 |
| 3,322,574 | A * | 5/1967 | Winsel et al. | 429/409 |
| 3,475,122 | A * | 10/1969 | McRae et al. | 423/539 |
| 3,859,195 | A | 1/1975 | Williams | 204/272 |
| 3,897,320 | A | 7/1975 | Cook, Jr. | 204/95 |
| 3,933,614 | A | 1/1976 | Bunn, Jr. | 204/266 |
| 4,099,489 | A * | 7/1978 | Bradley | 123/3 |
| 4,108,052 | A | 8/1978 | Cunningham | 99/275 |
| 4,121,543 | A | 10/1978 | Hicks, Jr. et al. | 123/3 |
| 4,154,578 | A | 5/1979 | Bane | 8/137 |
| 4,214,952 | A * | 7/1980 | Sato et al. | 205/148 |
| 4,244,079 | A | 1/1981 | Bane | 15/321 |
| 4,324,635 | A | 4/1982 | Sweeney | 204/266 |

(Continued)

FOREIGN PATENT DOCUMENTS

| | | |
|---|---|---|
| AU | 732602 | 4/2001 |
| CN | 1440711 | 9/2003 |

(Continued)

OTHER PUBLICATIONS

Zhang, Lijuan; Yi Zhang; Xuehua Zhang; Zhaoxia Li; Guangxia Shen, Ming Ye, Chunhai Fan; Haiping Fang; Jun Hu, "Electrochemically Controlled Formation and Growth of Hydrogen Nanobubbles", 2006, Langmuir, pp. 8109-8113.*

(Continued)

*Primary Examiner* — Lindsay Low
*Assistant Examiner* — Tea Holbrook
(74) *Attorney, Agent, or Firm* — David D. Brush; Westman, Champlin & Kelly P.A.

(57) ABSTRACT

A method and system for treating a combustible fluid and operating a combustion system, where the combustible fluid is introduced into an electrolysis cell, electrochemically activated in the electrolysis cell, and combusted in a combustion-based engine.

11 Claims, 3 Drawing Sheets

U.S. PATENT DOCUMENTS

| | | | | |
|---|---|---|---|---|
| 4,373,494 | A * | 2/1983 | McMahon | 123/538 |
| 4,374,711 | A | 2/1983 | Ogwa | 204/98 |
| 4,405,418 | A | 9/1983 | Takemura | 204/95 |
| 4,502,929 | A | 3/1985 | Stewart et al. | 204/147 |
| 4,603,167 | A | 7/1986 | Mahalek et al. | 524/706 |
| 4,630,167 | A | 12/1986 | Huggins | 361/213 |
| 4,663,091 | A | 5/1987 | Seo | 261/72.1 |
| 4,670,113 | A | 6/1987 | Lewis | 204/80 |
| 4,676,882 | A | 6/1987 | Okazaki | 204/260 |
| 4,687,558 | A | 8/1987 | Justice et al. | 204/59 |
| 4,705,191 | A | 11/1987 | Itzel et al. | 222/80 |
| 4,761,209 | A * | 8/1988 | Bonaventura et al. | 205/633 |
| 4,810,344 | A | 3/1989 | Okazaki | 204/228 |
| 4,832,230 | A | 5/1989 | Janowitz | 222/80 |
| 4,875,988 | A | 10/1989 | Aragon | 204/265 |
| 5,009,755 | A * | 4/1991 | Shor | 205/571 |
| 5,119,768 | A * | 6/1992 | Russell | 123/1 A |
| 5,186,860 | A | 2/1993 | Joyce, Jr. et al. | 252/500 |
| 5,292,406 | A | 3/1994 | Wanngard et al. | 204/95 |
| 5,316,646 | A | 5/1994 | Arai | 204/306 |
| 5,320,718 | A | 6/1994 | Molter et al. | 204/101 |
| 5,378,339 | A | 1/1995 | Aoki et al. | 204/260 |
| 5,458,095 | A * | 10/1995 | Post et al. | 123/3 |
| 5,484,512 | A * | 1/1996 | Sasaki et al. | 205/628 |
| 5,487,874 | A * | 1/1996 | Gibboney, Jr. | 422/186.03 |
| 5,536,389 | A | 7/1996 | La Naour et al. | 205/688 |
| 5,590,439 | A | 1/1997 | Alazet | |
| 5,632,870 | A | 5/1997 | Kucherov | 204/241 |
| 5,665,212 | A | 9/1997 | Zhong et al. | 304/297 |
| 5,733,434 | A | 3/1998 | Harada et al. | 205/746 |
| 5,762,779 | A | 6/1998 | Shiramizu et al. | 205/746 |
| 5,766,438 | A | 6/1998 | Ishibashi et al. | 204/520 |
| 5,779,891 | A | 7/1998 | Andelman | 210/198.2 |
| 5,815,869 | A | 10/1998 | Hopkins | 8/158 |
| 5,824,200 | A | 10/1998 | Kitajima et al. | 204/265 |
| 5,829,419 | A * | 11/1998 | Sadkin et al. | 123/538 |
| 5,858,201 | A | 1/1999 | Otsuka et al. | 205/701 |
| 5,858,202 | A | 1/1999 | Nakamura | 205/746 |
| 5,928,505 | A | 7/1999 | Inakagata et al. | 210/91 |
| 5,931,859 | A | 8/1999 | Burke | 607/66 |
| 5,997,283 | A * | 12/1999 | Spiros | 431/178 |
| 5,997,717 | A | 12/1999 | Miyashita et al. | 205/466 |
| 6,016,973 | A | 1/2000 | Thompson et al. | 239/304 |
| 6,024,073 | A * | 2/2000 | Butt | 123/538 |
| 6,032,655 | A | 3/2000 | Kavonius | |
| 6,036,827 | A * | 3/2000 | Andrews et al. | 204/252 |
| 6,059,941 | A | 5/2000 | Bryson et al. | 204/263 |
| 6,088,211 | A | 7/2000 | Pitel | 361/212 |
| 6,101,671 | A | 8/2000 | Wright et al. | 15/365 |
| 6,110,353 | A | 8/2000 | Hough | 205/701 |
| 6,132,572 | A | 10/2000 | Kim | |
| 6,200,434 | B1 | 3/2001 | Shinjo et al. | 204/230.2 |
| 6,231,747 | B1 | 5/2001 | Fukuzuka et al. | |
| 6,315,886 | B1 | 11/2001 | Zappi et al. | |
| 6,375,827 | B1 | 4/2002 | Kurosu et al. | 205/687 |
| 6,379,628 | B2 | 4/2002 | de Jong et al. | |
| 6,425,958 | B1 | 7/2002 | Giddings et al. | 134/21 |
| 6,488,016 | B2 | 12/2002 | Kavonius | |
| 6,502,766 | B1 | 1/2003 | Streutker et al. | |
| 6,585,827 | B2 | 7/2003 | Field et al. | 134/6 |
| 6,638,364 | B2 | 10/2003 | Harkins et al. | 134/21 |
| 6,652,719 | B1 | 11/2003 | Tseng | 204/257 |
| 6,662,632 | B1 * | 12/2003 | Parker et al. | 73/40 |
| 6,666,961 | B1 * | 12/2003 | Skoczylas et al. | 204/242 |
| 6,689,262 | B2 | 2/2004 | Senkiw | 204/278.5 |
| 6,691,927 | B1 * | 2/2004 | Malloy | 239/3 |
| 6,703,785 | B2 | 3/2004 | Aiki et al. | 315/111.81 |
| 6,719,891 | B2 | 4/2004 | Ruhr et al. | |
| 6,735,812 | B2 | 5/2004 | Heckman et al. | 15/320 |
| 6,770,105 | B2 * | 8/2004 | Berlin et al. | 44/321 |
| 6,842,940 | B2 | 1/2005 | Christopher et al. | 15/320 |
| 6,855,233 | B2 | 2/2005 | Sawada | |
| 6,857,397 | B2 * | 2/2005 | Zagaja et al. | 123/3 |
| 6,866,756 | B2 * | 3/2005 | Klein | 204/268 |
| 6,878,287 | B1 | 4/2005 | Marais | 210/748 |
| 6,921,743 | B2 | 7/2005 | Scheper et al. | |
| 6,926,819 | B2 | 8/2005 | Nakamura et al. | |
| 6,964,739 | B2 | 11/2005 | Boyd et al. | |
| 6,974,561 | B1 | 12/2005 | Thomason | |
| 7,008,523 | B2 | 3/2006 | Herrington | 205/701 |
| 7,011,739 | B2 | 3/2006 | Harkins et al. | |
| 7,059,013 | B2 | 6/2006 | Wydra et al. | 15/345 |
| 7,066,156 | B2 * | 6/2006 | Magyari | 123/538 |
| 7,083,875 | B2 * | 8/2006 | Lillis et al. | 429/422 |
| 7,156,962 | B2 | 1/2007 | Koizumi et al. | |
| 7,160,472 | B2 | 1/2007 | Vliet et al. | |
| 7,226,529 | B2 * | 6/2007 | Meltser | 204/263 |
| 7,226,542 | B2 | 6/2007 | Zemel et al. | |
| 7,238,272 | B2 | 7/2007 | Sano | 205/701 |
| 7,465,509 | B2 * | 12/2008 | Halliop et al. | 429/442 |
| 7,559,978 | B2 * | 7/2009 | Soloveichik et al. | 95/241 |
| 7,611,618 | B2 * | 11/2009 | Davidson | 205/341 |
| 8,220,440 | B2 * | 7/2012 | Adams | 123/538 |
| 2001/0002500 | A1 | 6/2001 | Kasen et al. | 15/320 |
| 2001/0034922 | A1 | 11/2001 | Ko | 15/320 |
| 2002/0023847 | A1 | 2/2002 | Natsume | |
| 2002/0027070 | A1 | 3/2002 | Oyokota et al. | 204/257 |
| 2002/0032141 | A1 | 3/2002 | Harkins | 510/253 |
| 2002/0074237 | A1 | 6/2002 | Takesako et al. | 205/628 |
| 2002/0112314 | A1 | 8/2002 | Harkins | 15/321 |
| 2002/0185423 | A1 | 12/2002 | Boyd et al. | 210/167 |
| 2003/0001439 | A1 * | 1/2003 | Schur | 310/11 |
| 2003/0062068 | A1 | 4/2003 | Ko et al. | 134/28 |
| 2003/0070919 | A1 | 4/2003 | Gilmore | 204/275.1 |
| 2003/0102270 | A1 | 6/2003 | Schoeberl | 210/748 |
| 2003/0159230 | A1 | 8/2003 | Oh | |
| 2003/0159231 | A1 | 8/2003 | Oh | 15/320 |
| 2003/0159233 | A1 | 8/2003 | Oh | 15/321 |
| 2003/0164306 | A1 | 9/2003 | Senkiw | 205/633 |
| 2003/0213505 | A1 | 11/2003 | Price et al. | |
| 2004/0011665 | A1 | 1/2004 | Koizumi et al. | 205/626 |
| 2004/0012913 | A1 | 1/2004 | Andelman | 361/503 |
| 2004/0037737 | A1 | 2/2004 | Marais et al. | 422/28 |
| 2004/0069611 | A1 | 4/2004 | MacGregor | 204/157.15 |
| 2004/0108203 | A1 * | 6/2004 | Sullivan | 204/276 |
| 2004/0112763 | A1 | 6/2004 | Itoh et al. | 205/746 |
| 2004/0166019 | A1 | 8/2004 | Schultheiss | 422/22 |
| 2004/0168933 | A1 | 9/2004 | Inoue | |
| 2004/0226123 | A1 | 11/2004 | Policicchio et al. | 15/115 |
| 2004/0250323 | A1 | 12/2004 | Arai et al. | D32/1 |
| 2004/0256247 | A1 | 12/2004 | Carson et al. | 205/688 |
| 2005/0121334 | A1 | 6/2005 | Sumita | 205/628 |
| 2005/0126928 | A1 * | 6/2005 | Hung et al. | 205/746 |
| 2005/0136520 | A1 | 6/2005 | Kinley et al. | 435/155 |
| 2005/0139239 | A1 | 6/2005 | Prae | |
| 2005/0139808 | A1 | 6/2005 | Alimi | |
| 2005/0194261 | A1 | 9/2005 | Hadia | 205/701 |
| 2005/0244556 | A1 | 11/2005 | Karren | |
| 2005/0279332 | A1 * | 12/2005 | Zhang | 123/538 |
| 2006/0037869 | A1 | 2/2006 | Mitchke | |
| 2006/0076248 | A1 | 4/2006 | Kindred | |
| 2006/0162735 | A1 | 7/2006 | Thiebaut | 132/200 |
| 2006/0169575 | A1 | 8/2006 | Sumita | |
| 2006/0231503 | A1 | 10/2006 | Flettner | 210/748 |
| 2006/0263240 | A1 | 11/2006 | Hopkins | 422/28 |
| 2006/0280664 | A1 | 12/2006 | Huang et al. | |
| 2007/0023273 | A1 | 2/2007 | Kitaori et al. | |
| 2007/0037267 | A1 | 2/2007 | Lewis et al. | 435/161 |
| 2007/0080071 | A1 * | 4/2007 | Perry, Jr. | 205/638 |
| 2007/0141434 | A1 | 6/2007 | Joshi et al. | |
| 2007/0170072 | A1 | 7/2007 | Shyu | 205/701 |
| 2007/0186367 | A1 | 8/2007 | Field et al. | 15/320 |
| 2007/0186368 | A1 | 8/2007 | Field et al. | 15/320 |
| 2007/0186957 | A1 | 8/2007 | Field et al. | 134/18 |
| 2007/0186958 | A1 | 8/2007 | Field et al. | 134/21 |
| 2007/0187263 | A1 | 8/2007 | Field et al. | 205/742 |
| 2007/0238010 | A1 * | 10/2007 | Zhang et al. | 429/44 |
| 2008/0023334 | A1 * | 1/2008 | Nakagawa et al. | 204/632 |
| 2008/0135807 | A1 * | 6/2008 | Adams | 252/373 |
| 2008/0138676 | A1 * | 6/2008 | Adams | 429/17 |
| 2008/0141984 | A1 * | 6/2008 | Haga | 123/525 |
| 2008/0179194 | A1 * | 7/2008 | Robinson | 205/462 |
| 2008/0257751 | A1 * | 10/2008 | Smola et al. | 205/628 |
| 2008/0264778 | A1 | 10/2008 | Joshi et al. | |
| 2008/0277273 | A1 * | 11/2008 | Logan | 204/253 |
| 2009/0000574 | A1 * | 1/2009 | Sugimasa et al. | 123/3 |
| 2009/0008268 | A1 | 1/2009 | Salathe et al. | 205/746 |

| | | | | |
|---|---|---|---|---|
| 2009/0028767 | A1 * | 1/2009 | Parker et al. | 423/235 |
| 2009/0038955 | A1 * | 2/2009 | Rau | 205/508 |
| 2009/0127128 | A1 | 5/2009 | Kitaori et al. | 205/464 |
| 2009/0133675 | A1 * | 5/2009 | Clack | 123/537 |
| 2009/0148342 | A1 | 6/2009 | Bromberg et al. | 422/37 |
| 2009/0162505 | A1 | 6/2009 | Kriebel et al. | 426/335 |
| 2009/0184186 | A1 | 7/2009 | Suda et al. | 239/690 |
| 2009/0212132 | A1 | 8/2009 | Simmonds et al. | 239/289 |
| 2009/0235481 | A1 | 9/2009 | Gosebruch et al. | 15/320 |
| 2009/0235587 | A1 * | 9/2009 | Hawkes et al. | 48/202 |
| 2010/0189805 | A1 | 7/2010 | Saefkow et al. | 424/600 |
| 2010/0192987 | A1 | 8/2010 | Steffen et al. | 134/34 |
| 2010/0275858 | A1 * | 11/2010 | Jeffs et al. | 123/3 |

FOREIGN PATENT DOCUMENTS

| | | | |
|---|---|---|---|
| CN | 1845877 | A | 10/2006 |
| CN | 200977495 | Y | 11/2007 |
| DE | 2951993 | | 7/1981 |
| DE | 8430251 | | 6/1984 |
| DE | 8430251 | U1 | 6/1984 |
| DE | 4406320 | | 8/1995 |
| DE | 19752174 | | 7/1998 |
| DE | 20210562 | | 10/2002 |
| DE | 202004010572 | U1 | 11/2004 |
| DE | 202007005471 | | 6/2007 |
| DE | 202007004181 | U1 | 8/2007 |
| DE | 102007017502 | | 10/2008 |
| EP | 0041373 | | 12/1981 |
| EP | 0104345 | | 4/1984 |
| EP | 0199493 | | 10/1986 |
| EP | 0438902 | | 7/1991 |
| EP | 0636581 | | 2/1995 |
| EP | 0663176 | A1 | 7/1995 |
| EP | 0672623 | | 9/1995 |
| EP | 0740329 | | 10/1996 |
| EP | 761235 | B1 | 3/1997 |
| EP | 1000554 | B1 | 5/2000 |
| EP | 1008662 | | 6/2000 |
| EP | 1162176 | | 12/2001 |
| EP | 1188719 | | 3/2002 |
| EP | 1293481 | B1 | 3/2003 |
| EP | 1308421 | | 5/2003 |
| EP | 1065170 | | 1/2004 |
| EP | 1386995 | | 2/2004 |
| EP | 1309519 | B1 | 9/2004 |
| EP | 1533041 | A1 | 5/2005 |
| EP | 1671560 | | 6/2006 |
| EP | 1741676 | A2 | 1/2007 |
| EP | 1754804 | | 2/2007 |
| EP | 1903128 | A2 | 3/2008 |
| EP | 1932809 | | 6/2008 |
| EP | 1941912 | A1 | 7/2008 |
| EP | 1978142 | | 10/2008 |
| EP | 2050378 | | 4/2009 |
| EP | 2078700 | | 7/2009 |
| EP | 2078701 | | 7/2009 |
| FR | 2381835 | | 9/1978 |
| FR | 2909370 | A1 | 6/2008 |
| GB | 611819 | | 11/1948 |
| GB | 2149423 | | 11/1983 |
| GB | 2141738 | | 1/1985 |
| GB | 2298858 | | 9/1996 |
| GB | 2381187 | | 4/2003 |
| GB | 2393737 | | 4/2004 |
| JP | 62023663 | | 2/1987 |
| JP | 1111483 | | 4/1989 |
| JP | 03157188 | | 7/1991 |
| JP | 07233493 | | 9/1995 |
| JP | 07263391 | | 10/1995 |
| JP | 08112574 | | 5/1996 |
| JP | 09075427 | | 3/1997 |
| JP | 1997174054 | A | 7/1997 |
| JP | 11090442 | | 9/1997 |
| JP | 10057282 | | 3/1998 |
| JP | 11010159 | A | 1/1999 |
| JP | 2000079393 | A | 3/2000 |
| JP | 2002-102856 | | 4/2002 |
| JP | 2002-186969 | | 7/2002 |
| JP | 2003062573 | A | 3/2003 |
| JP | 2003181338 | A | 7/2003 |
| JP | 2003261190 | A | 9/2003 |
| JP | 2003266073 | A | 9/2003 |
| JP | 2003334557 | A | 11/2003 |
| JP | 2004-073914 | | 3/2004 |
| JP | 2004-129954 | | 4/2004 |
| JP | 2004148108 | A | 5/2004 |
| JP | 2004148109 | A | 5/2004 |
| JP | 2005-535783 | | 11/2005 |
| JP | 2006-036341 | | 9/2006 |
| JP | 2007-000402 | | 1/2007 |
| JP | 2007-136356 | | 6/2007 |
| JP | 2007-239041 | | 9/2007 |
| KR | 20010096847 | A | 11/2001 |
| KR | 2002-0025023 | | 11/2003 |
| KR | 2006-0007369 | | 1/2006 |
| KR | 100599229 | | 7/2006 |
| NL | 1012257 | C2 | 12/2000 |
| WO | 8606098 | | 10/1986 |
| WO | 9640591 | | 12/1996 |
| WO | 9818723 | | 5/1998 |
| WO | 9846874 | | 10/1998 |
| WO | 9908719 | A2 | 2/1999 |
| WO | 9963843 | A1 | 12/1999 |
| WO | 0015561 | | 3/2000 |
| WO | 0118279 | | 3/2001 |
| WO | 0214228 | A2 | 2/2002 |
| WO | 02066382 | A1 | 8/2002 |
| WO | 02102716 | | 12/2002 |
| WO | 03009920 | | 2/2003 |
| WO | 03022444 | | 3/2003 |
| WO | 03040038 | | 5/2003 |
| WO | 2004015172 | | 2/2004 |
| WO | 2004079051 | | 9/2004 |
| WO | 2004106242 | A1 | 12/2004 |
| WO | 2004108607 | | 12/2004 |
| WO | 2005014058 | A1 | 2/2005 |
| WO | 2005020780 | | 3/2005 |
| WO | 2005079468 | | 9/2005 |
| WO | 2005093129 | | 10/2005 |
| WO | 2005094904 | | 10/2005 |
| WO | 2005097350 | | 10/2005 |
| WO | 2005012186 | A1 | 2/2006 |
| WO | 2006124805 | | 11/2006 |
| WO | 2007031779 | | 3/2007 |
| WO | 2007093395 | | 8/2007 |
| WO | 2007095072 | | 8/2007 |
| WO | 2007095074 | | 8/2007 |
| WO | 2007138363 | | 12/2007 |
| WO | 2007142693 | | 12/2007 |
| WO | 2007145058 | | 12/2007 |
| WO | 2007145385 | | 12/2007 |
| WO | 2008032544 | A1 | 3/2008 |
| WO | 2008061546 | A1 | 5/2008 |
| WO | 2008131389 | A1 | 10/2008 |
| WO | 2009011841 | | 1/2009 |
| WO | 2009039674 | | 4/2009 |
| WO | 2009040407 | | 4/2009 |
| WO | 2009046563 | | 4/2009 |
| WO | 2009067838 | | 6/2009 |
| WO | 2009155546 | | 12/2009 |

OTHER PUBLICATIONS

Office Action from the United States Patent and Trademark Office for U.S. Appl. No. 11/655,385, dated Jan. 29, 2010.

Written Opinion dated Jan. 21, 2010 from International Application No. PCT/US2009/046375, filed Jun. 5, 2009.

International Search Report dated Jan. 21, 2010 for International Application No. PCT/2009/046375, filed Jun. 5, 2009.

Aoki et al., "Wafer Treatment Using Electrolysis-Ionized Water", 1994, Jpn. J. Appl. Phys. vol. 33, pp. 5686-5689.

Bluhm, Hans J. et al., "Disruption and Destruction of Biological Cells Using Strong Pulsed Electric Fields" Nachrichten, Karlsruhe, DE, vol. 3, Jan. 1, 2005, pp. 105-110.

Final Office Action from the United States Patent and Trademark Office for U.S. Appl. No. 11/655,378, dated Jul. 2, 2010.

Notice of Allowance from the United States Patent and Trademark Office for U.S. Appl. No. 11/655,385, dated Jul. 14, 2010.

Office Action from the United States Patent and Trademark Office for U.S. Appl. No. 11/655,390, dated Jul. 19, 2010.
Restriction/Election Requirement from the United States Patent and Trademark Office for U.S. Appl. No. 11/655,365, dated Aug. 17, 2010.
Office Action from the United States Patent and Trademark Office for U.S. Appl. No. 11/655,359, dated Aug. 18, 2010.
Office Action from the United States Patent and Trademark Office for U.S. Appl. No. 11/655,378, dated Sep. 9, 2010.
Office Action from the United States Patent and Trademark Office for U.S. Appl. No. 11/655,415, dated Sep. 29, 2010.
Office Action from the United States Patent and Trademark Office for U.S. Appl. No. 11/655,360, dated Sep. 30, 2010.
Office Action from the United States Patent and Trademark Office for U.S. Appl. No. 12/122,350, dated Sep. 30, 2010.
Office Action from the United States Patent and Trademark Office for U.S. Appl. No. 11/655,310, dated Oct. 1, 2010.
Office Action from the United States Patent and Trademark Office for U.S. Appl. No. 11/655,389, dated Oct. 1, 2010.
Office Action from the United States Patent and Trademark Office for U.S. Appl. No. 11/655,365, dated Dec. 3, 2010.
Notice of Allowance from the United States Patent and Trademark Office for U.S. Appl. No. 11/655,390, dated Jan. 6, 2011.
Final Office Action from the United States Patent and Trademark Office for U.S. Appl. No. 11/655,378, dated Jan. 25, 2011.
Office Action from the United States Patent and Trademark Office for U.S. Appl. No. 11/655,359, dated Feb. 3, 2011.
Notice of Allowance from the United States Patent and Trademark Office for U.S. Appl. No. 12/122,350, dated Mar. 16, 2011.
Notice of Allowance from the United States Patent and Trademark Office for U.S. Appl. No. 11/655,389, dated Mar. 17, 2011.
Notice of Allowance from the United States Patent and Trademark Office for U.S. Appl. No. 11/655,360, dated Mar. 18, 2011.
Notice of Allowance from the United States Patent and Trademark Office for U.S. Appl. No. 11/655,415, dated Mar. 23, 2011.
Notice of Allowance from the United States Patent and Trademark Office for U.S. Appl. No. 11/655,310, dated Mar. 23, 2011.
Notice of Allowability from the United States Patent and Trademark Office for U.S. Appl. No. 11/655,378, dated Apr. 28, 2011.
Notice of Allowance from the United States Patent and Trademark Office for U.S. Appl. No. 11/655,378, dated May 10, 2011.
JP-HC15022149.
"Conductive Polymers: Evaluation of Industrial Applications" Synthetic Metals, 55-57 (1993) 3623-3631 S. Roth et al.
"Fast-Foam Scrubbing Technology, The Safe Scrubbing Alternative,T5-Parts Manual," Tennant Company, www.tennantco.com, 2006.
"Fast-Foam Scrubbing Technology, The Safe Scrubbing Alternative, T5-Scrubber-Dryer Operator Manual," Tennant Company, www.tennantco.com, 2006.
"ECO Smarte—The Best Multiple Mineral Technology for Problem Well Water; The Best Chemical Reduction System for City Water Complete Bacteria and Scale Control," ECOsmarte® Planet Friendly, Inc., http://www.ecosmarte.com/ sciencesummary.html, 1994, pp. 1-13.
"Krebs Engineers® Products," 2006 Krebs Engineers, http//www.krebs.com/about.php/ and http://www.krebs.com/products/php/product/20/CycloClean%AE+Modules, 2006, pp. 1-3.
"The Oxygenator Livelier Bait-Healthier fish," Aqua Innovations, Inc., aquainnovationsinc.com, published prior toJan. 19, 2007, pp. 1-2.
"JP102 Water Cell," Emco Tech Co., Ltd. of Goyang-City Kyungki-Do, South Korea, Oct. 18, 2006, pp. 1.
Mary Jones, "Richfield-Based EcoSmarte has Perfected a Natural-and Profitable-Approach to Water Purification,"Minnesota Technology, Inside Technology and Manufacturing Business, Fall 2005, pp. 1-3.
Office Action from the United States Patent and Trademark Office for U.S. Appl. No. 11/655,390, dated Jan. 19, 2007.
Office Action from the United States Patent and Trademark Office for U.S. Appl. No. 11/655,359, dated Mar. 19, 2009.
Restriction Requirement from the United States Patent and Trademark Office for U.S. Appl. No. 11/655,390, dated Apr. 10, 2009.
Office Action from the United States Patent and Trademark Office for U.S. Appl. No. 11/655,390, dated Jul. 16, 2009.
Office Action from the United States Patent and Trademark Office for U.S. Appl. No. 11/655,359, dated Nov. 13, 2009.
Restriction Requirement from the United States Patent and Trademark Office for U.S. Appl. No. 11/655,385, dated Dec. 9, 2009.
Final Office Action from the United States Patent and Trademark Office for U.S. Appl. No. 11/655,390, dated Jan. 11, 2010.
Office Action from the United States Patent and Trademark Office for U.S. Appl. No. 11/655,378, dated Jan. 14, 2010.

* cited by examiner

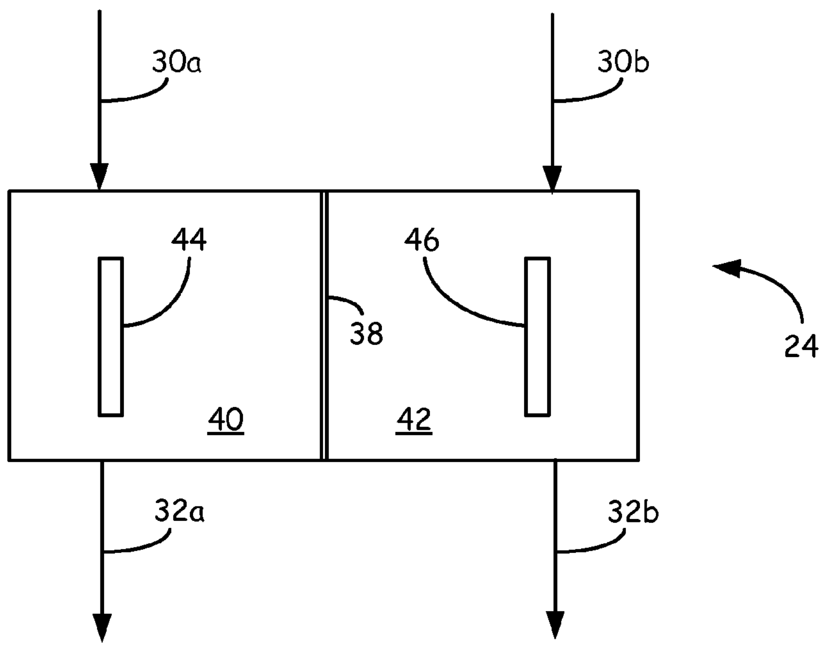
FIG. 2
FIG. 3
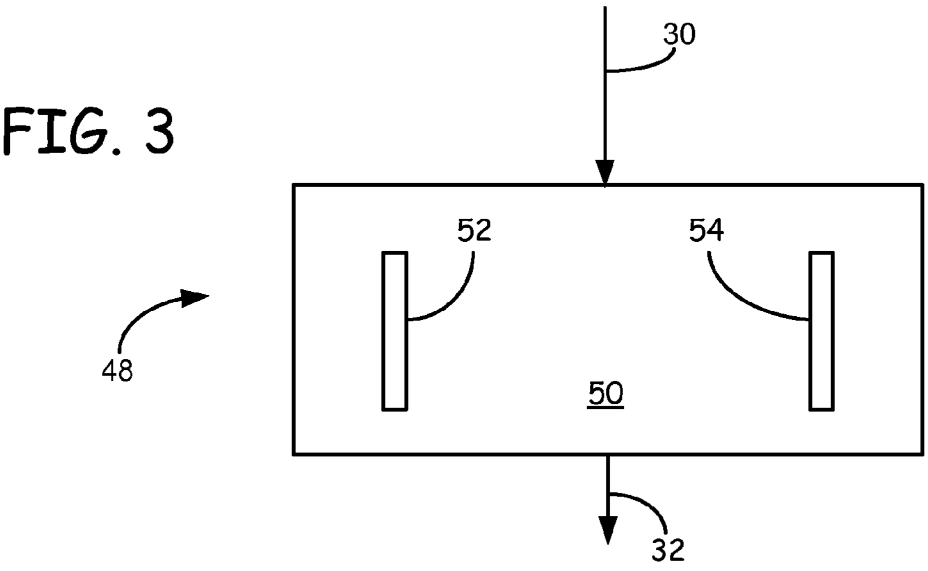

FUEL COMBUSTION METHOD AND SYSTEM

CROSS-REFERENCE TO RELATED APPLICATION(S)

The present application claims priority to U.S. Provisional Application No. 61/059,175, filed on Jun. 5, 2008, and entitled "FUEL COMBUSTION METHOD AND SYSTEM", the disclosure of which is incorporated by reference in its entirety.

FIELD OF THE DISCLOSURE

The present disclosure relates to the combustion of fuel, such as combustion in an internal combustion engine. More specifically, the present disclosure relates to treating fuel for increasing combustion efficiency.

BACKGROUND

Fuel combustion is used in a variety of different applications to produce usable work. For example, an internal combustion engine is a type of engine in which the combustion of fuel and an oxidizer (typically air) occurs in a confined space called a combustion chamber. The resulting reaction creates gasses at high temperature and pressure, which expand and act to cause movement of parts in the engine, such as pistons, turbines, and rotors.

There is a desire to increase engine efficiency so that combustion converts a greater amount of the chemical energy in the fuel into kinetic energy. Although many different methods and apparatus have been proposed or used in the past to increase engine efficiency, current engine technology is far from perfect. The lack of efficiency results in wasted energy during the combustion process. As a result, there is a continuing desire to increase further engine efficiency.

SUMMARY

An aspect of the disclosure is directed to a method for treating a combustible fluid. The method includes introducing the combustible fluid into an electrolysis cell, where the electrolysis cell has at least one cathode electrode and at least one anode electrode, and applying a voltage potential across the at least one cathode electrode and the at least one anode electrode to generate gas-phase bubbles in the combustible fluid.

Another aspect of the disclosure is directed to a method for operating a combustion-based engine. The method includes pumping a stream of a combustible fuel from a supply reservoir, introducing a first portion of the combustible fuel into an anode chamber of an electrolytic cell, and introducing a second portion of the combustible fuel into a cathode chamber of the electrolytic cell. The method further includes applying a voltage potential across the first and second portions of the combustible fuel to generate gas-phase bubbles in at least one of the first and second portions of the combustible fuel, where the generated gas-phase bubbles comprise a gas-phase composition at least partially derived from the combustible fuel and having an ionic charge. The method also includes feeding the first and second portions of the combustible fuel from the electrolytic cell to the combustion-based engine, and combusting the first and second portions of the combustible fuel in the combustion-based engine.

A further aspect of the disclosure is directed to a combustion system that includes a supply reservoir configured to retain a combustible fuel in a substantially liquid state, a fluid pump configured to pump a stream of the combustible fuel from the supply reservoir, an electrolysis cell, and a combustion-based engine configured to receive the combustible fuel in an electrochemically-activated state from the electrolysis cell, and to combust the electrochemically-activated combustible fuel. The electrolysis cell includes a chamber configured to receive the pumped stream of the combustible fuel, an anode electrode disposed within the chamber and configured to be electrically connected to a power source, and a cathode electrode disposed within the chamber and configured to be electrically connected to the power source.

BRIEF DESCRIPTION OF THE DRAWINGS

FIG. 2 is a schematic illustration of an electrolysis cell of the combustion system, where the electrolysis cell has a dual-chamber arrangement with an ion-exchange membrane.

FIG. 3 is a schematic illustration of an alternative electrolysis cell of the combustion system, where the alternative electrolysis cell includes a single-chamber arrangement without an ion-exchange membrane.

DETAILED DESCRIPTION

An aspect of the present disclosure relates to methods and systems for increasing efficiency of fuel combustion, such as fuel combustion in an engine. The present disclosure applies to a variety of different fuel types including, but not limited to, petroleum-based fuels, alcohol-based fuels (e.g., methanol and ethanol), coal-based fuels (e.g., coal slurries), biofuels, vegoils, and combinations thereof. Suitable petroleum-based fuels include linear and branched alkanes ($C_nH_{2n+2}$), cycloalkanes ($C_nH_{2n}$), and aromatic hydrocarbons ($C_nH_n$), with suitable average molecule chains ranging from $C_5$ to $C_{20}$. Examples of suitable petroleum-based fuels include petrol-based fuels (e.g., $C_5H_{12}$ to $C_8H_{18}$), diesel/kerosene-based fuels (e.g., $C_9H_{20}$ to $C_{16}H_{34}$), and blends thereof. The present disclosure is suitable for use with a variety of different engine configurations, such as internal combustion engines (e.g., piston-based and rotary-based engines), external combustion engines (e.g., steam-based and Stirling engines), and continuous combustion engines (e.g., gas turbine engines), and the engines may be used for a variety of functions, such as propulsion for motorized vehicles and energy generation for power plants.

Figure 1:
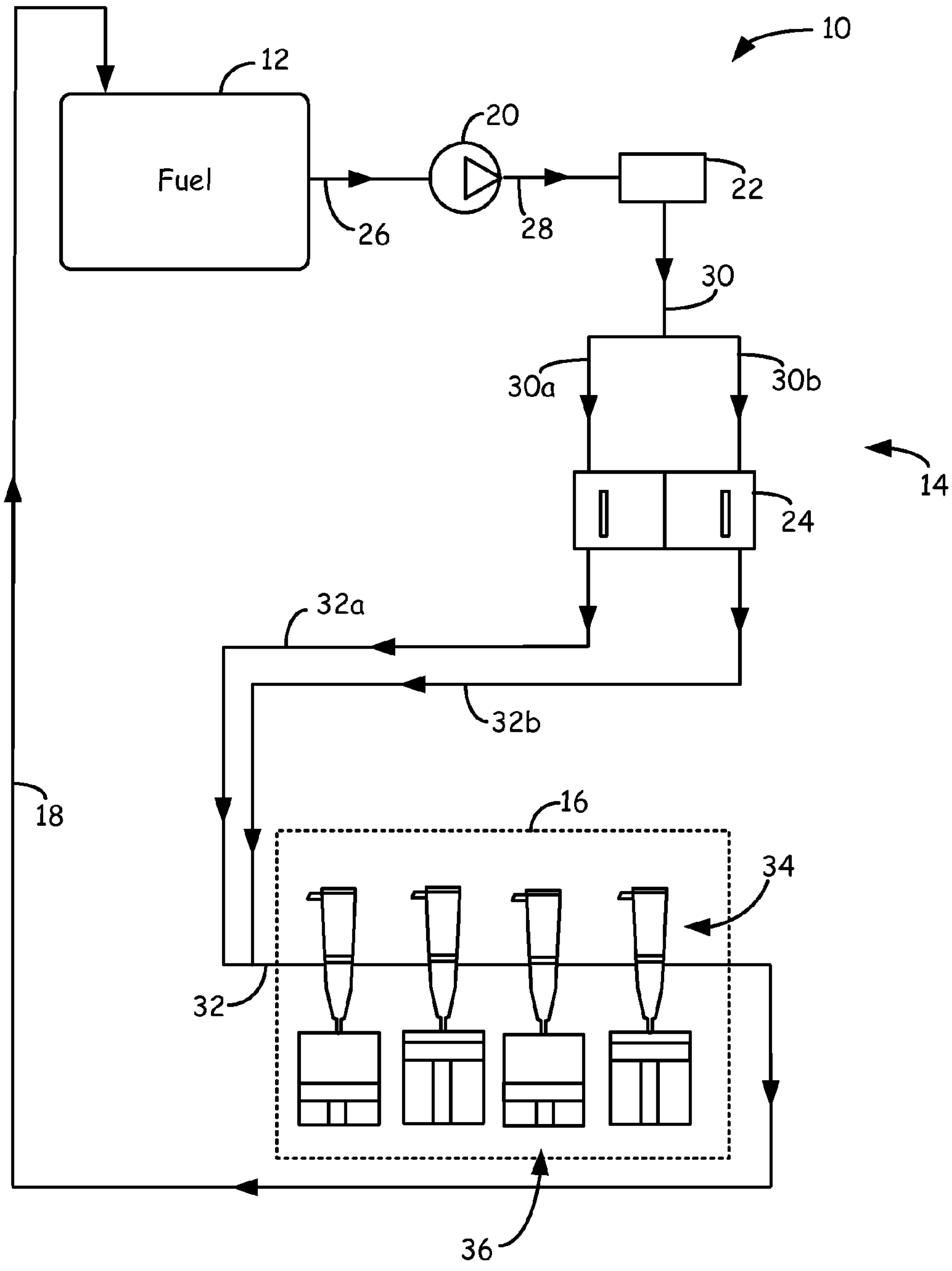
FIG. 1 is a schematic illustration of a combustion system configured to increase fuel combustion.

FIG. 1 is a schematic illustration of combustion system 10, which illustrates an aspect of the present disclosure that increases fuel combustion by generating gas-phase bubbles (e.g., macrobubbles, microbubbles, and nanobubbles) within the liquid phase of the fuel, prior to combustion, by passing the fuel through an energized electrolysis cell. As shown in FIG. 1, combustion system 10 includes fuel tank 12, injection line 14, engine 16, and return line 18, where fuel tank 12 is a suitable reservoir for retaining a supply of fuel in a substantially liquid state. As used herein, the term "substantially liquid state" refers to a liquid-phase carrier fluid that may also contain small concentrations of solid-phase impurities and gas-phase bubbles. Injection line 14 interconnects fuel tank 12 and engine 16, and includes circulation pump 20, filter 22, and electrolysis cell 24, which are respectively interconnected by feed lines 26, 28, 30, and 32.

Circulation pump 20 is a fluid pump that desirably maintains a continuous circulation of the fuel through fuel tank 12, injection line 14, engine 16, and return line 18 during operation. Circulation pump 20 also desirably pressurizes the fuel to one or more levels that reduce the risk of incurring vapor locking conditions through injection line 14, while also allowing the gas-phase bubbles generated in electrolysis cell 24 to maintain their integrities. Examples of suitable pressures for the fuel through injection line 14 include pressures ranging from about 34 kilopascals (about 5 pounds/square-inch (psi)) to about 480 kilopascals (about 70 psi), with particularly suitable pressures ranging from about 70 kilopascals (about 10 psi) to about 350 kilopascals (about 50 psi), and with even more particularly suitable pressures ranging from about 100 kilopascals (about 15 psi) to about 170 kilopascals (about 25 psi). Other pressures outside of these suitable ranges may also be used.

Filter 22 is a suitable fuel filter for removing contaminants from the fuel flowing through injection line 14. In the embodiment shown in FIG. 1, feed lines 30 and 32 respectively engage electrolysis cell 24 with a pair of feed inlets (referred to as feed inlets 30*a* and 30*b*) and a pair feed outlets (referred to as feed outlets 32*a* and 32*b*). Accordingly, the stream of the fuel flowing through feed line 30 is split into sub-streams and enters feed electrolysis cell 24 via feed inlets 30*a* and 30*b*. In alternative embodiments, feed lines 30 and 32 may respectively engage electrolysis cell 24 with any suitable number of feed inlets and outlets. Furthermore, in additional alternative embodiments, multiple electrolysis cells 24 may be incorporated into injection line 14. In these embodiments, feed lines 30 and 32 may branch into two or more feed inlets and feed outlets for each of the electrolysis cells 24. In even further additional alternative embodiments, electrolysis cell 24 may exhibit tubular dimensions, where the incoming stream of fuel flows through one or more coaxial pathways of the tubular electrolysis cell.

Electrolysis cell 24 is a fluid treatment cell that is adapted to apply an electric field across the fuel between at least one anode electrode and at least one cathode electrode. Suitable cells for electrolysis cell 24 may have any suitable number of electrodes, and any suitable number of chambers for containing the fuel. As discussed below, electrolysis cell 24 may include one or more ion exchange membranes between the anode and cathode, or can be configured without ion exchange membranes. Electrolysis cell 24 may have a variety of different structures, such as, but not limited to those disclosed in Field et al., U.S. Patent Publication No. 2007/0186368, published Aug. 16, 2007.

The electric field applied across the fuel electrochemically activates the fuel flowing through electrolysis cell 24, which generates gas-phase bubbles of one or more compounds in the fuel, where the generated gas-phase bubbles are dispersed or otherwise suspended throughout the liquid phase of the flowing fuel. The sizes of the gas-phase bubbles may vary depending on a variety of factors, such as the pressure of injection line 14, the composition of the fuel, and the extent of the electrochemical activation. Accordingly, the gas-phase bubbles may have a variety of different sizes, including, but not limited to macrobubbles, microbubbles, nanobubbles, and mixtures thereof. In embodiments including macrobubbles, examples of suitable average bubble diameters for the generated bubbles include diameters ranging from about 500 micrometers to about one millimeter. In embodiments including microbubbles, examples of suitable average bubble diameters for the generated bubbles include diameters ranging from about one micrometer to less than about 500 micrometers. In embodiments including nanobubbles, examples of suitable average bubble diameters for the generated bubbles include diameters less than about one micrometer, with particularly suitable average bubble diameters including diameters less than about 500 nanometers, and with even more particularly suitable average bubble diameters including diameters less than about 100 nanometers. The small average diameters of the gas-phase bubbles reduce the risk of vapor locking injection line 14 during operation, despite retaining a portion of the fuel in a gas phase.

Upon exiting electrolysis cell 24, the electrochemically-activated fuel, which contains gas-phase bubbles, flows through feed outlets 32*a* and 32*b*, and the sub-streams of the fuel re-converge at feed line 32. The electrochemically-activated fuel then flows into engine 16 via feed line 32. Engine 16 is illustrated as a piston-based, internal-combustion engine that includes a plurality of fuel injectors 34, each of which engage with a piston chamber 36 of engine 16. While engine 16 is illustrated as a standard piston-based, internal-combustion engine, combustion system 10 may alternatively include a variety of different engine configurations, as discussed above. For example, engine 16 may be replaced with a gas turbine engine (not shown), where fuel injectors 34 extend circumferentially around the entrance of a combustion stage of the turbine engine. In an additional alternative embodiment, fuel injectors 34 may be replaced with one or more carburetor-based assemblies to introduce the electrochemically-activated fuel to piston chambers 36.

As shown in FIG. 1, feed line 32 directs the electrochemically-activated fuel to each of fuel injectors 34, and also connects with return line 18 to re-circulate the unused portion of the fuel back to fuel tank 12. Fuel injectors 34 are desirably electronic fuel injectors (e.g., solenoid-operated injectors) that spray discrete amounts of the electrochemically-activated fuel toward an air intake manifold of engine 16 to mix the electrochemically-activated fuel with incoming air for combustion. The gas-phase bubbles of the fuel is sprayed along with the liquid phase of the fuel, thereby allowing the gases of the bubbles to readily mix with the incoming air. This increases the efficiency of the combustion process within each of piston chambers 36, and increases the overall combustion-to-fuel mass ratio.

Furthermore, electrolysis cell 24 may be readily installed in injection lines of existing engines and generators without requiring substantial reconfigurations. For example, electrolysis cell 24, feed inlets 30*a* and 30*b*, and feed outlets 32*a* and 32*b* may be installed along a fuel rail of an existing vehicle injection line, such as between the fuel pump (e.g., circulation pump 20) and the one or more fuel injectors (e.g., fuel injectors 34). Alternatively, electrolysis cell 24 may be installed at a variety of different locations along injection line 14, such as between fuel tank 12 and circulation pump 20, or between circulation pump 20 and filter 22. In these alternative embodiments, filter 22 is desirably configured to substantially allow passage of the generated gas-phase bubbles. In additional alternative embodiments in which the stream of the fuel is not separated prior to entering the electrolytic cell (e.g., with tubular electrolytic cells), the electrolytic cell may be directly installed along the fuel rail of the existing vehicle injection line.

In addition to increasing combustion efficiencies, electrolysis cell 24 may also be used to reduce the concentration of water within the fuel flowing through injection line 14. Water is a known contaminant in liquid fuel, which can reduce or prevent combustion reactions from occurring. This is particularly problematic within the aviation industry, where water commonly collects in the wing-located fuel tanks, and can induce engine stalling if not properly removed before flight. During operation, electrolysis cell 24 may generate gas-phase bubbles of hydrogen and oxygen from the water contaminants retained in the fuel that flows through electrolysis cell 24. This accordingly converts the otherwise non-combustible water into combustible hydrogen and oxygen gas-phase bubbles, which may further increase combustion efficiencies.

FIG. 2 is a schematic illustration of electrolysis cell 24, which is an example of a suitable membrane-based electrolysis cell for electrochemically activating the fuel flowing through feed inlets 30*a* and 30*b*. As shown, electrolysis cell 24 includes membrane 38, which separates electrolysis cell 24 into anode chamber 40 and cathode chamber 42. While electrolysis cell 24 is illustrated in FIG. 2 as having a single anode chamber and a single cathode chamber, electrolysis cell 24 may alternatively include a plurality of anode and cathode chambers separated by one or more membranes 38.

Membrane 38 is an ion exchange membrane, such as a cation exchange membrane (i.e., a proton exchange membrane) or an anion exchange membrane. Suitable cation exchange membranes for membrane 38 include partially and fully fluorinated ionomers, polyaromatic ionomers, and combinations thereof. Examples of suitable commercially available ionomers for membrane 38 include sulfonated tetrafluorethylene copolymers available under the trademark "NAFION" from E.I. du Pont de Nemours and Company, Wilmington, Del.; perfluorinated carboxylic acid ionomers available under the trademark "FLEMION" from Asahi Glass Co., Ltd., Japan; perfluorinated sulfonic acid ionomers available under the trademark "ACIPLEX" Aciplex from Asahi Chemical Industries Co. Ltd., Japan; and combinations thereof.

Anode chamber 40 and cathode chamber 42 respectively include anode electrode 44 and cathode electrode 46, where membrane 38 is disposed between anode electrode 44 and cathode electrode 46. Anode electrode 44 and cathode electrode 46 can be made from any suitable electrically-conductive material, such as titanium, and may be coated with one or more precious metals (e.g., platinum). Anode electrode 48 and cathode electrode 50 may each also exhibit a variety of different geometric designs and constructions, such as flat plates, coaxial plates (e.g., for tubular electrolytic cells), rods, and combinations thereof; and may have solid constructions or can have one or more apertures (e.g., metallic meshes). While anode chamber 40 and cathode chamber 42 are each illustrated with a single anode electrode 44 and cathode electrode 46, anode chamber 40 may include a plurality of anode electrodes 44, and cathode chamber 42 may include a plurality of cathode electrodes 46.

Anode electrode 44 and cathode electrode 46 may be electrically connected to opposing terminals of a conventional power supply (not shown). The power supply can provide electrolysis cell 24 with a constant direct-current (DC) output voltage, a pulsed or otherwise modulated DC output voltage, or a pulsed or otherwise modulated AC output voltage, to anode electrode 44 and cathode electrode 46. The power supply can have any suitable output voltage level, current level, duty cycle, or waveform. In one embodiment, the power supply applies the voltage supplied to anode electrode 44 and cathode electrode 46 at a relative steady state. The power supply includes a DC/DC converter that uses a pulse-width modulation (PWM) control scheme to control voltage and current output. Other types of power supplies can also be used, which can be pulsed or not pulsed, and at other voltage and power ranges. The parameters are application-specific. The polarities of anode electrode 44 and cathode electrode 46 may also be flipped during operation to remove any scales that potentially form on anode electrode 44 and cathode electrode 46.

During operation, the fuel is supplied to electrolysis cell 24 from feed inlets 30*a* and 30*b*. The fuel flowing through feed inlet 30*a* flows into anode chamber 40, and the fuel flowing through feed inlet 30*b* flows into cathode chamber 42. A voltage potential is applied to electrochemically activate the fuel flowing through anode chamber 40 and cathode chamber 42. For example, in an embodiment in which membrane 46 is a cation exchange membrane, a suitable voltage (e.g., a DC voltage) potential is applied across anode electrode 44 and cathode electrode 46. The actual potential required at any position within electrolytic cell 24 may be determined by the local composition of the fuel. In addition, a greater potential difference (i.e., over potential) is desirably applied across anode electrode 44 and cathode electrode 46 to deliver a significant reaction rate. Platinum-based electrodes typically require an addition of about one-half of a volt to the potential difference between the electrodes. In addition, a further potential is desirable to drive the current through electrolytic cell 24. Examples of suitable applied voltage potentials for electrolysis cell 24 range from about 1 volt to about 40 volts, with particularly suitable voltages ranging from about 5 volts to about 25 volts, and with even more particularly suitable voltages ranging from about 10 volts to about 20 volts.

Upon application of the voltage potential across anode electrode 44 and cathode electrode 46, cations (e.g., $H^+$) generated in the fuel of anode chamber 40 transfer across membrane 38 towards cathode electrode 46, while anions (e.g., $OH^-$) generated in the fuel of anode chamber 40 move towards anode electrode 44. Similarly, cations (e.g., $H^+$) generated in the fuel of cathode chamber 42 also move towards cathode electrode 46, and anions (e.g., $OH^-$) generated in the fuel of cathode chamber 42 attempt to move towards anode electrode 44. However, membrane 38 prevents the transfer of the anions present in cathode chamber 42. Therefore, the anions remain confined within cathode chamber 42.

While the electrolysis continues, the anions in the fuel bind to the metal atoms (e.g., platinum atoms) at anode electrode 44, and the cations in the fuel (e.g., hydrogen) bind to the metal atoms (e.g., platinum atoms) at cathode electrode 46. These bound atoms diffuse around in two dimensions on the surfaces of the respective electrodes until they take part in further reactions. Other atoms and polyatomic groups may also bind similarly to the surfaces of anode electrode 44 and cathode electrode 46, and may also subsequently undergo reactions. Molecules such as oxygen ($O_2$), hydrogen ($H_2$), and methane ($CH_4$) produced at the surfaces may enter small cavities in the liquid phase of the fuel (i.e., bubbles) as gases and/or may become solvated by the liquid phase of the fuel.

Surface tension at a gas-liquid interface is produced by the attraction between the molecules being directed away from the surfaces of anode electrode 44 and cathode electrode 46 as the surface molecules are more attracted to the molecules within the fuel than they are to molecules of the gas at the electrode surfaces. In contrast, molecules of the bulk of the fuel are equally attracted in all directions. Thus, in order to increase the possible interaction energy, surface tension causes the molecules at the electrode surfaces to enter the bulk of the liquid.

In the embodiments in which gas-phase nanobubbles are generated, the gas contained in the nanobubbles (i.e., bubbles having diameters of less than about one micrometer) are also believed to be stable for substantial durations in the liquid phase fuel, despite their small diameters. While not wishing to be bound by theory, it is believed that the surface tension of the fuel, at the gas/liquid interface, drops when curved surfaces of the gas bubbles approach molecular dimensions. This reduces the natural tendency of the nanobubbles to dissipate.

Furthermore, nanobubble gas/liquid interface is charged due to the voltage potential applied across membrane 38. The charge introduces an opposing force to the surface tension, which also slows or prevents the dissipation of the nanobubbles. The presence of like charges at the interface reduces the apparent surface tension, with charge repulsion acting in the opposite direction to surface minimization due to surface tension. Any effect may be increased by the presence of additional charged materials that favor the gas/liquid interface.

The natural state of the gas/liquid interfaces appears to be negative. Other ions with low surface charge density and/or high polarizability (such as $Cl^-$, $ClO^-$, $HO_2^-$, and $O_2^-$) also favor the gas/liquid interfaces, as do hydrated electrons. Aqueous radicals also prefer to reside at such interfaces. Thus, it is believed that the nanobubbles present in the catholyte (i.e., the sub-stream flowing through cathode chamber 42) are negatively charged, but those in the anolyte (i.e., the sub-stream flowing through anode chamber 40) will possess little charge (the excess cations cancelling out the natural negative charge). Accordingly, catholyte nanobubbles are not likely to lose their charge on mixing with the anolyte sub-stream at the convergence point of feed line 32 (shown in FIG. 1), and are otherwise stable for a duration that is greater than the residence time of the electrochemically-activated fuel within feed line 32.

Additionally, gas molecules may become charged within the nanobubbles (such as $O_2^-$), due to the excess potential on the cathode, thereby increasing the overall charge of the nanobubbles. The surface tension at the gas/liquid interface of charged nanobubbles can be reduced relative to uncharged nanobubbles, and their sizes stabilized. This can be qualitatively appreciated as surface tension causes surfaces to be minimized, whereas charged surfaces tend to expand to minimize repulsions between similar charges. Raised temperature at the electrode surface, due to the excess power loss over that required for the electrolysis, may also increase nanobubble formation by reducing local gas solubility.

As the repulsion force between like charges increases inversely as the square of their distances apart, there is an increasing outwards pressure as a bubble diameter decreases. The effect of the charges is to reduce the effect of the surface tension, and the surface tension tends to reduce the surface whereas the surface charge tends to expand it. Thus, equilibrium is reached when these opposing forces are equal. For example, assuming the surface charge density on the inner surface of a gas bubble (radius r) is $\Phi(e^-/\text{meter}^2)$, the outwards pressure ("$P_{out}$"), can be found by solving the Navier-Stokes equations to give:

$$P_{out}=\Phi^2/2D\epsilon_0 \quad \text{(Equation 1)}$$

where D is the relative dielectric constant of the gas bubble (assumed unity), "$\epsilon_0$" is the permittivity of a vacuum (i.e., 8.854 pF/meter). The inwards pressure ("$P_{in}$") due to the surface tension on the gas is:

$$P_{in}=2g/rP_{out} \quad \text{(Equation 2)}$$

where "g" is the surface tension (0.07198 Joules/meter$^2$ at 25° C.). Therefore if these pressures are equal, the radius of the gas bubble is:

$$r=0.28792\ \epsilon_0/\Phi^2 \quad \text{(Equation 3)}$$

Accordingly, for nanobubble diameters of 5 nanometers, 10 nanometers, 20 nanometers, 50 nanometers, and 100 nanometers the calculated charge density for zero excess internal pressure is 0.20, 0.14, 0.10, 0.06 and 0.04 $e^-$/nanometer$^2$ bubble surface area, respectively. Such charge densities are readily achievable with the use of electrolysis cell 24. The nanobubble radius increases as the total charge on the bubble increases to the power ⅔. Under these circumstances at equilibrium, the effective surface tension of the fuel at the nanobubble surface is zero, and the presence of charged gas in the bubble increases the size of the stable nanobubble. Further reduction in the bubble size would not be indicated as it would cause the reduction of the internal pressure to fall below atmospheric pressure.

In various situations within electrolysis cell 24, the nanobubbles may divide into even smaller bubbles due to the surface charges. For example, assuming that a bubble of radius "r" and total charge "q" divides into two bubbles of shared volume and charge (radius $r_{1/2}=r/2^{1/3}$, and charge $q_{1/2}=q/2$), and ignoring the Coulomb interaction between the bubbles, calculation of the change in energy due to surface tension ($\Delta E_{ST}$) and surface charge ($\Delta E_q$) gives:

$$\Delta E_{ST}=+2\left(4\pi\gamma r_{\frac{1}{2}}^2\right)-4\pi\gamma r^2=4\pi\gamma r^2\left(2^{1/3}-1\right) \quad \text{(Equation 3)}$$

and $$\Delta E_q=-2\left(\frac{1}{2}\times\frac{\left(\frac{q}{2}\right)^2}{4\pi\varepsilon_0 r_{\frac{1}{2}}}\right)-\frac{1}{2}\times\frac{q^2}{4\pi\varepsilon_0 r}=\frac{q^2}{8\pi\varepsilon_0 r}\left(1-2^{-2/3}\right) \quad \text{(Equation 4)}$$

The bubble is metastable if the overall energy change is negative which occurs when $\Delta E_{ST}+\Delta E_q$ is negative, thereby providing:

$$\frac{q^2}{8\pi\varepsilon_0 r}\left(1-2^{-2/3}\right)+4\pi\gamma r^2\left(2^{1/3}-1\right)\leq 0 \quad \text{(Equation 5)}$$

which provides the relationship between the radius and the charge density ($\Phi$):

$$\Phi=\frac{q}{4\pi r^2}\geq\sqrt{\frac{2\gamma\varepsilon_0}{r}\frac{\left(2^{1/3}-1\right)}{\left(1-2^{-2/3}\right)}} \quad \text{(Equation 6)}$$

Accordingly, for nanobubble diameters of 5 nanometers, 10 nanometers, 20 nanometers, 50 nanometers, and 100 nanometers the calculated charge density for bubble splitting 0.12, 0.08, 0.06, 0.04 and 0.03 $e^-$/nanometer$^2$ bubble surface area, respectively. For the same surface charge density, the bubble diameter is typically about three times larger for reducing the apparent surface tension to zero than for splitting the bubble in two. Thus, the nanobubbles will generally not divide unless there is a further energy input.

As discussed above, the electrochemically-activated fuel, containing the gas-phase bubbles (e.g., macrobubbles, microbubbles, and nanobubbles), exits electrolysis cell 24 via feed outlets 32*a* and 32*b*, and the sub-streams re-converge at feed line 32 prior to entering fuel injectors 34 (shown in FIG. 1). Although the anolyte and catholyte fuels are blended prior to entering fuel injectors 34, they are initially not in equilibrium and temporarily retain their electrochemically-activated states. The retention of the gas-phase nanobubbles is apparent even after the fuels are blended by a visually observable cloudiness to the fuel entering engine 16. The cloudiness is believed to be due to the presence of the gas-phase bubbles dispersed or otherwise suspended in the liquid-phase fuel. Accordingly, the electrochemically-activated fuel contains gas-phase bubbles dispersed/suspended in the liquid-phase fuel, which increases combustion efficiency in combustion-based engines.

FIG. 3 is a schematic illustration of electrolysis cell 48, which is an example of an alternative electrolysis cell to cell 24 (shown in FIGS. 1 and 2) for electrochemically activating the fuel flowing through feed inlet, without the use of an ion exchange membrane. Accordingly, electrolysis cell 48 may engage directly with feed lines 30 and 32. As shown in FIG. 3, electrolysis cell 48 includes reaction chamber 50, anode electrode 52, and cathode electrode 54. Reaction chamber 50 can be defined by the walls of electrolysis cell 48, by the walls of a container or conduit in which anode electrode 52 and cathode electrode 54 are placed, or by anode electrode 52 and cathode electrode 54 themselves. Suitable materials and constructions for anode electrode 52 and cathode electrode 54 include those discussed above for anode electrode 44 and cathode electrode 46 (shown in FIG. 2).

During operation, the fuel is introduced into reaction chamber 50 via feed line 30, and a voltage potential is applied across anode electrode 52 and cathode electrode 54. This electrochemically activates the fuel, where portions of the fuel near or in contact with anode electrode 52 and cathode electrode 54 generate gas-phase bubbles in the same manner as discussed above for electrolysis cell 24. Thus, the fuel flowing through electrolysis cell 48 contains gas-phase bubbles dispersed or otherwise suspended in the liquid-phase fuel. In comparison to electrolysis cell 24, however, the electrochemically-activated fuel is blended during the entire electrolysis process, rather than being split upstream from, or within, the electrolysis cell, and then re-converged, or within, downstream from the electrolysis cell. Accordingly, the resulting electrochemically-activated fuel contains gas-phase bubbles dispersed/suspended in the liquid-phase fuel, which increases combustion efficiency in engine 16, as discussed above.

Figure 4:
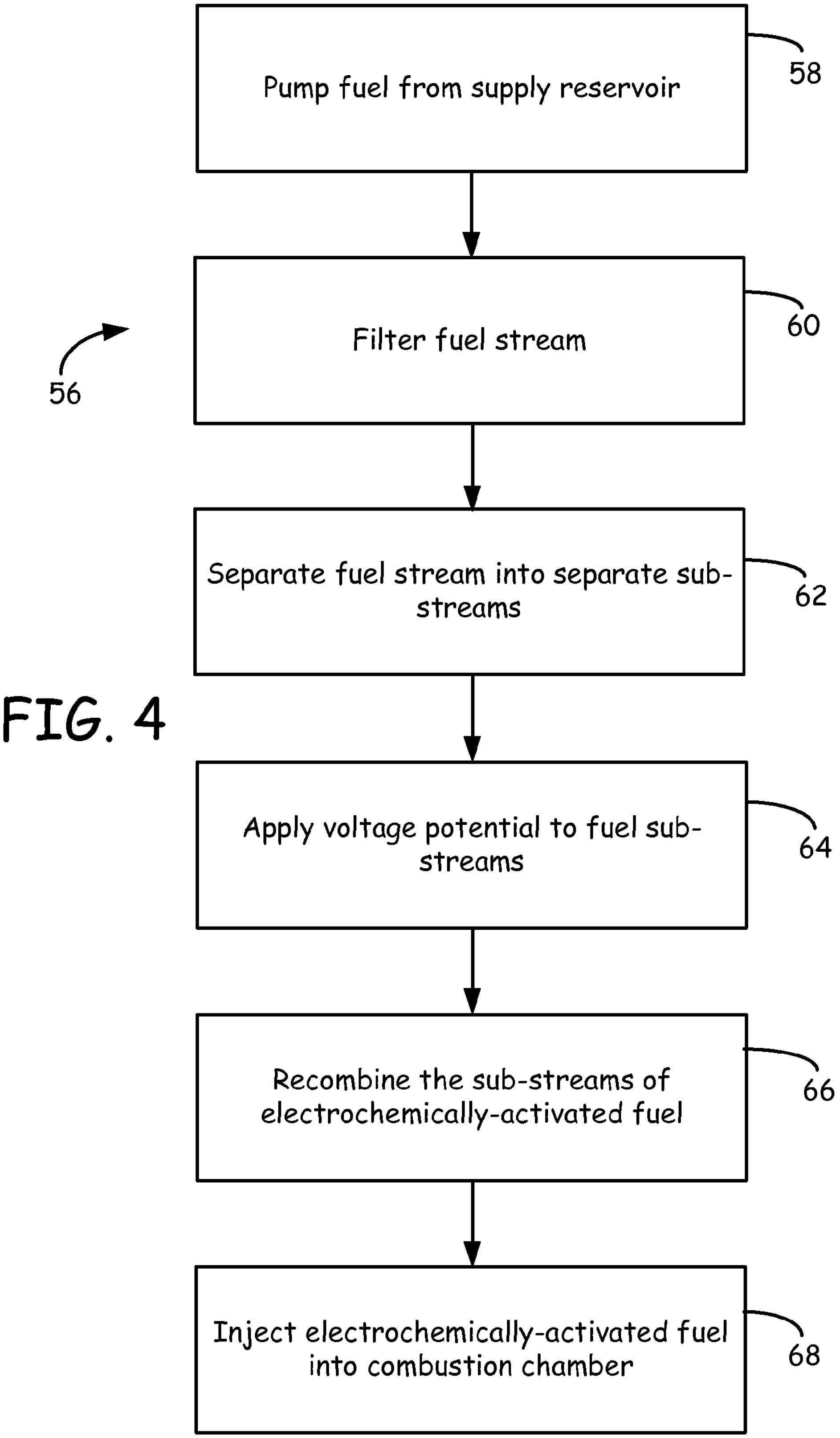
FIG. 4 is a flow diagram of a method for treating a combustible fuel and using the treated combustible fuel to operate a combustion-based engine.

FIG. 4 is a flow diagram of method 56 for treating a combustible fluid (e.g., fuel) and using the treated fuel to operate a combustion-based engine. Method 56 includes steps 58-68, and initially involves pumping the fuel from a supply reservoir (step 58) and through a fuel filter to remove any potential impurities in the fuel stream (step 60). The fuel stream may then be split into multiple sub-streams to enter the anode and cathode chambers of one or more electrolysis cells (step 62). As discussed above, this may be performed prior to the fuel stream entering the electrolysis cell(s), or may be performed within the electrolysis cell(s). As further discussed above, in alternative embodiments in which the one or more electrolysis cells do not incorporate ion-exchange membranes, steps 62 and 66 of method 56 may be omitted. While the fuel sub-streams flow through the electrolysis cell, a voltage potential is applied across anode and cathode electrodes and to the sub-streams (step 64). This generates gas-phase bubbles in the liquid-phase of the fuel, where the gas-phase bubbles maintain their integrities due to their small diameters and ionic charges, as discussed above.

The electrochemically-activated fuel sub-streams may then be recombined prior to entering a combustion-based engine to provide a single entering fuel stream (step 66). For example, the sub-streams may be recombined after exiting the electrolytic cell as discussed above for electrolytic cell 24 (shown in FIGS. 1 and 2), or prior to exiting the electrolytic cell (e.g., for tubular electrolytic cells). In alternative embodiments, the separation between the electrochemically-activated fuel streams maybe maintained until the fuel streams reach the fuel injectors. When the electrochemically-activated fuel reaches the fuel injectors, the fuel is injected into the combustion chambers of the engine to initiate one or more combustion reactions. The gas-phase bubbles dispersed and/or suspended in the liquid-phase fuel are injected with the liquid-phase fuel, thereby mixing with the oxygen to increase combustion efficiencies.

Although the present disclosure has been described with reference to one or more embodiments, workers skilled in the art will recognize that changes may be made in form and detail without departing from the spirit and scope of the disclosure and/or the appended claims.

The invention claimed is:

1. A method for operating a combustion-based engine, the method comprising:

providing a combustible fluid comprising hydrocarbon molecules with molecule chains ranging from $C_5$ to $C_{20}$;

introducing the combustible fluid into an electrolysis cell, the electrolysis cell having at least one cathode electrode and at least one anode electrode; and applying a voltage potential across the at least one cathode electrode and the at least one anode electrode to electrolyze the combustible fluid, which generates gas-phase bubbles in the combustible fluid, wherein the generated gas-phase bubbles are selected from the group consisting of macrobubbles, microbubbles, nanobubbles, and combinations thereof;

feeding the electrolyzed combustible fluid from the electrolytic cell to the combustion-based engine; and combusting the electrolyzed combustible fuel in the combustion-based engine.

2. The method of claim 1, and further comprising maintaining separation of at least two portions of the streams of the combustible fluid with at least one ion exchange membrane disposed between the at least one cathode electrode and the at least one anode electrode.

3. The method of claim 1, wherein the generated gas-phase bubbles have average bubble diameters including diameters less than about one micrometer.

4. The method of claim 1, wherein the applied voltage potential ranges from about 1 volt to about 40 volts.

5. The method of claim 1, wherein the combustible fluid is selected from the group consisting of petroleum-based fuels, alcohol-based fuels, coal-based fuels, biofuels, vegoils, and combinations thereof.

6. A method for operating a combustion-based engine, the method comprising:

pumping a stream of a combustible fuel from a supply reservoir;

introducing a first portion of the combustible fuel into an anode chamber of an electrolytic cell;

introducing a second of the combustible fuel into a cathode chamber of the electrolytic cell;

applying a voltage potential across the first and second portions of the combustible fuel to electrolyze the combustible fuel, which generates gas-phase bubbles in at least one of the first and second portions of the combustible fuel, the generated gas-phase bubbles comprising a gas-phase composition at least partially derived from the combustible fuel and having an ionic charge, wherein the generated voltage potential ranges from about 1 volt to about 40 volts;

feeding the first and second portions of the electrolyzed combustible fuel from the electrolytic cell to the combustion-based engine; and combusting the first and second portions of the electrolyzed combustible fuel in the combustion-based engine.

7. The method of claim 6, and further comprising pressurizing the stream of the combustible fuel to one or more pressures ranging from about 34 kilopascals to about 480 kilopascals.

8. The method of claim 6, and further comprising maintaining separation of the anode chamber and the cathode chamber within the electrolysis cell with an ion exchange membrane.

9. The method of claim 6, and further comprising filtering the stream of the combustible fuel.

10. The method of claim 6, wherein the generated gas-phase bubbles are selected from the group consisting of macrobubbles, microbubbles, nanobubbles, and combinations thereof.

11. The method of claim 6, wherein the generated gas-phase bubbles have average bubble diameters including diameters less than about one micrometer.

* * * * *

UNITED STATES PATENT AND TRADEMARK OFFICE

CERTIFICATE OF CORRECTION

PATENT NO. : 8,485,140 B2
APPLICATION NO. : 12/479006
DATED : July 16, 2013
INVENTOR(S) : Bruce F. Field It is certified that error appears in the above-identified patent and that said Letters Patent is hereby corrected as shown below:

Title Page, item [73] Assignee:

Delete "Global Patent Investment Group, LLC" and insert -- Global Opportunities Investment Group, LLC --

Signed and Sealed this
Nineteenth Day of November, 2013

Teresa Stanek Rea
*Deputy Director of the United States Patent and Trademark Office*